T866011

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 2, 1969

866 O.G. 23

809,368

CORROSION INHIBITING

Joseph B. Arots, Wilmington, Del., and Joseph E. Mirolli, Chester, Pa., assignors to Hercules Incorporated, Wilmington, Del., a corporation of Delaware

Filed Mar. 21, 1969. Published Sept. 2, 1969

Int. Cl. C08g *51/62, 43/00*

U.S. Cl. 260—37

No Drawing. 11 Pages Specification

The corrosive effects of carbon black filled epihalohydrin polymer vulcanizates can be inhibited by the addition of at least about 5%, based on the weight of the polymer, of a lead compound, such as a lead oxide, and from about 3% to about 20%, based on the weight of the polymer of a sulfonate corrosion inhibiting agent such as barium dinonylnaphthalene sulfonate. The sulfonate corrosion inhibiting agent will have the general formula $$[R-\overset{\overset{O}{|}}{\underset{\underset{O}{|}}{S}}-O]_xM$$

where R is an alkaryl radical, M is a metal selected from Groups I–A, II–A, II–B, IV–A and VIII of the Periodic Table, ammonia and amine radicals and $x$ is an integer from 1 to 3. The epihalohydrin polymers treated in this way are polyethers containing halomethyl groups attached to the main polymer chain.